United States Patent
Chuang

[11] Patent Number: 6,052,452
[45] Date of Patent: Apr. 18, 2000

[54] PAY PHONE

[76] Inventor: Tung-Wen Chuang, No.25, Lane 169, Kang-Ning St., His-Chin Chen, Taipei Hsien, Taiwan

[21] Appl. No.: 09/116,306

[22] Filed: Jul. 15, 1998

[51] Int. Cl.[7] ................................................. H04M 17/00
[52] U.S. Cl. .................... 379/143; 379/146; 379/150; 379/153; 194/344; 232/28; 232/44
[58] Field of Search ...................... 379/143, 146, 379/147, 148, 150, 152, 153, 155, 447, 454; 232/20, 27–28, 44, 55, 57–58, 64, 66; 194/256, 302, 344, 346

[56] References Cited

U.S. PATENT DOCUMENTS

| | | | |
|---|---|---|---|
| 4,991,202 | 2/1991 | Su | 379/146 |
| 5,483,583 | 1/1996 | Chen | 379/146 |
| 5,724,415 | 3/1998 | Mills et al. | 379/150 |
| 5,901,828 | 5/1999 | Monie | 194/346 |

*Primary Examiner*—Paul Loomis
*Assistant Examiner*—Binh K. Tieu
*Attorney, Agent, or Firm*—Pro-Tehctor International Services

[57] ABSTRACT

A pay phone having an operation module acted with a switch hook and a push button, the operation module including a base frame, a movable frame pivoted to the base frame and defining with the base frame a coin passage for guiding an inserted coin from a coin slot to a coin box when the line is connected, or to a coin-return assembly when the switch hook of the pay phone is depressed or the handset of the pay phone is hung up before connection of the line, a suspension frame controlled by a push button through a switching frame to guide the inserted coin from the coin passage way to the coin box.

6 Claims, 6 Drawing Sheets

PAY PHONE

BACKGROUND OF THE INVENTION

The present invention relates to a pay phone, and more particularly to such a pay phone which enables inserted coins to be smoothly guided to a coin box or a coin-return assembly.

Regular pay phones are generally operated by coins. The operation module which controls the operation of a pay phone is comprised of a plurality of metal spring plates arranged in a stack or lines. A pay phone of this design is heavy, and easy to fail. Furthermore, an inserted coin may easily be jammed in the metal spring plates.

SUMMARY OF THE INVENTION

It is one object of the present invention to provide a pay phone which has a simple structure. It is another object of the present invention to provide a pay phone which guides inserted coins smoothly from the coin slot to the coin box or the coin-return assembly without causing a jam. According to the present invention, the pay phone comprises a handset, a switch hook, a push button, a coin slot, a coin box, a coin-return assembly and an operation module acted with said switch hook and said push button to achieve the functions of "talk", "coin intake", "line off" and "coin return", wherein the operation module comprises a base frame, a movable frame pivoted to the base frame and defining with the base frame a coin passage for guiding an inserted coin from a coin slot to the coin box when the line is connected, or to the coin-return assembly when the switch hook is depressed or the handset is hung up before connection of the line, a suspension frame controlled by the push button through a switching frame to guide the inserted coin from the coin passage way to the coin box.

BRIEF DESCRIPTION OF THE DRAWINGS

FIG. 6-1 shows the "coin intake" operation of the operation module according to the present invention.

FIG. 6-2 is similar to FIG. 6-1 but showing the coin passed through the coin inlet on the control board of the suspension frame.

FIG. 7-1 shows the "coin return" operation of the operation module according to the present invention.

FIG. 7-2 is similar to FIG. 7-1 but showing the coin moved out of the sliding track to the coin outlet on the base frame.

DETAILED DESCRIPTION OF THE PREFERRED EMBODIMENT

Figure 1:
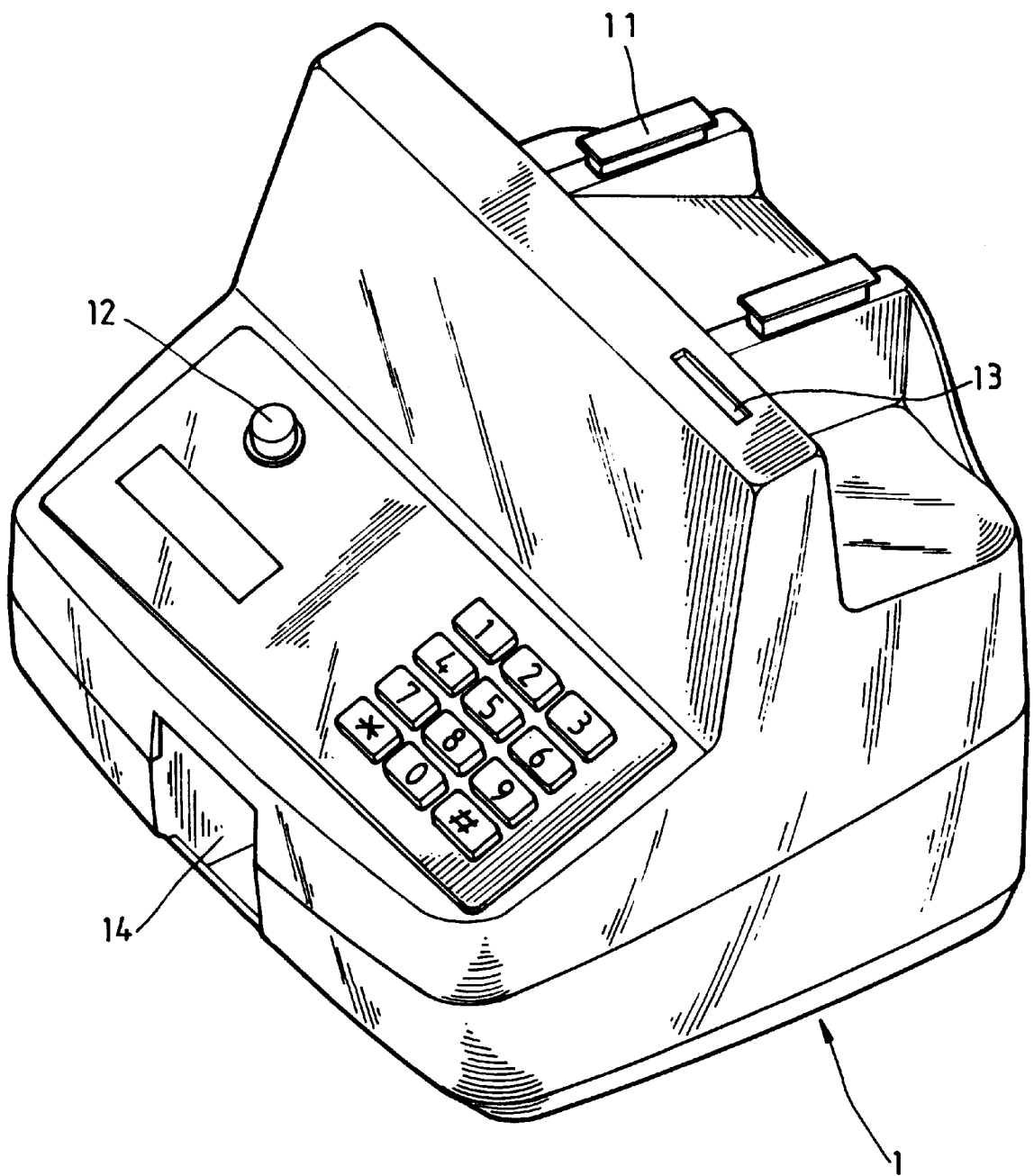
FIG. 1 is a perspective view of a pay phone according to the present invention.

Referring to FIG. 1, a pay phone 1 is shown comprised of a switch hook 11, a push button 12, a coin slot 13, and a coin-return assembly 14.

Figure 2:
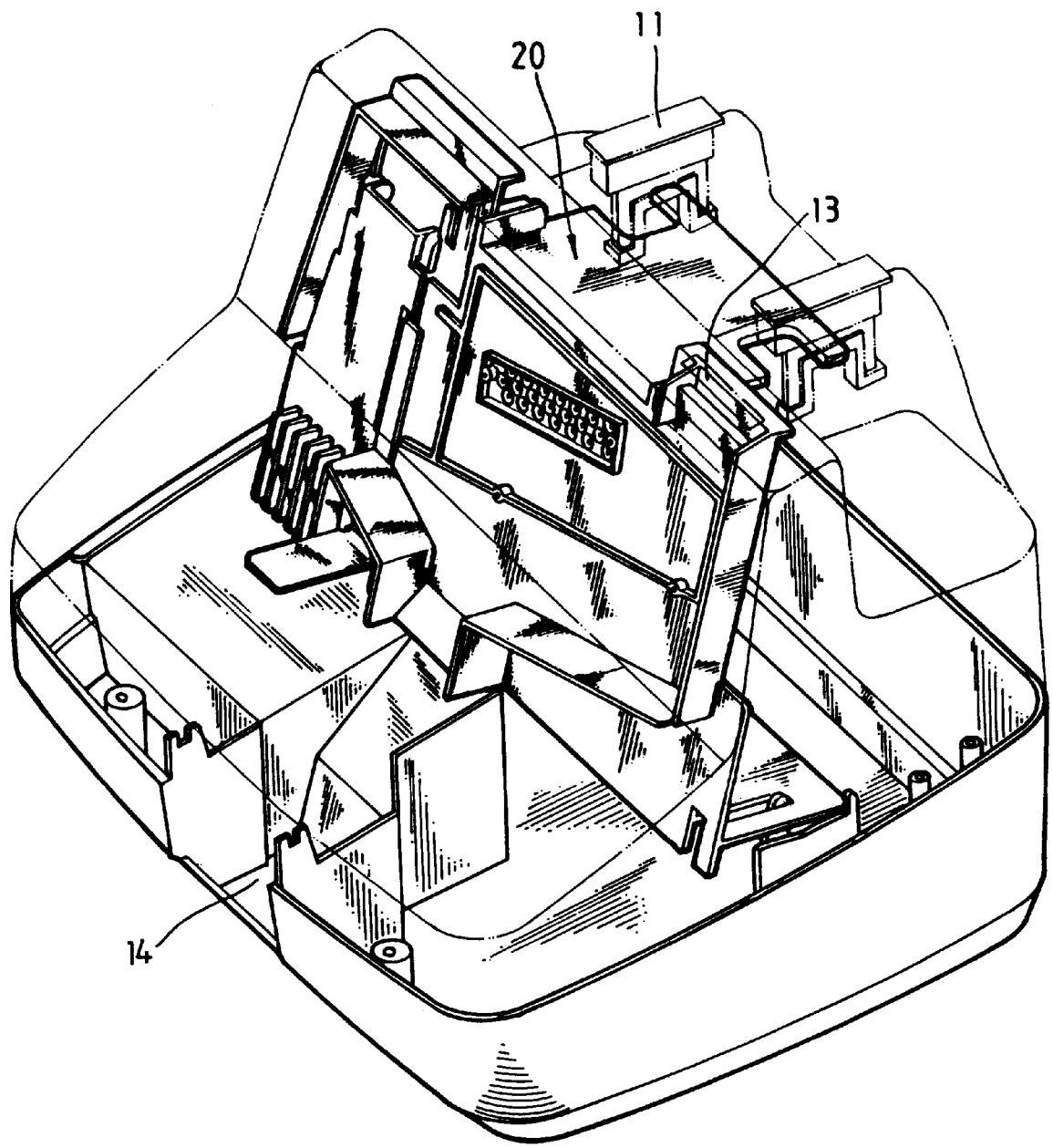
FIG. 2 shows the internal structure of the pay phone according to the present invention.
Figure 3:
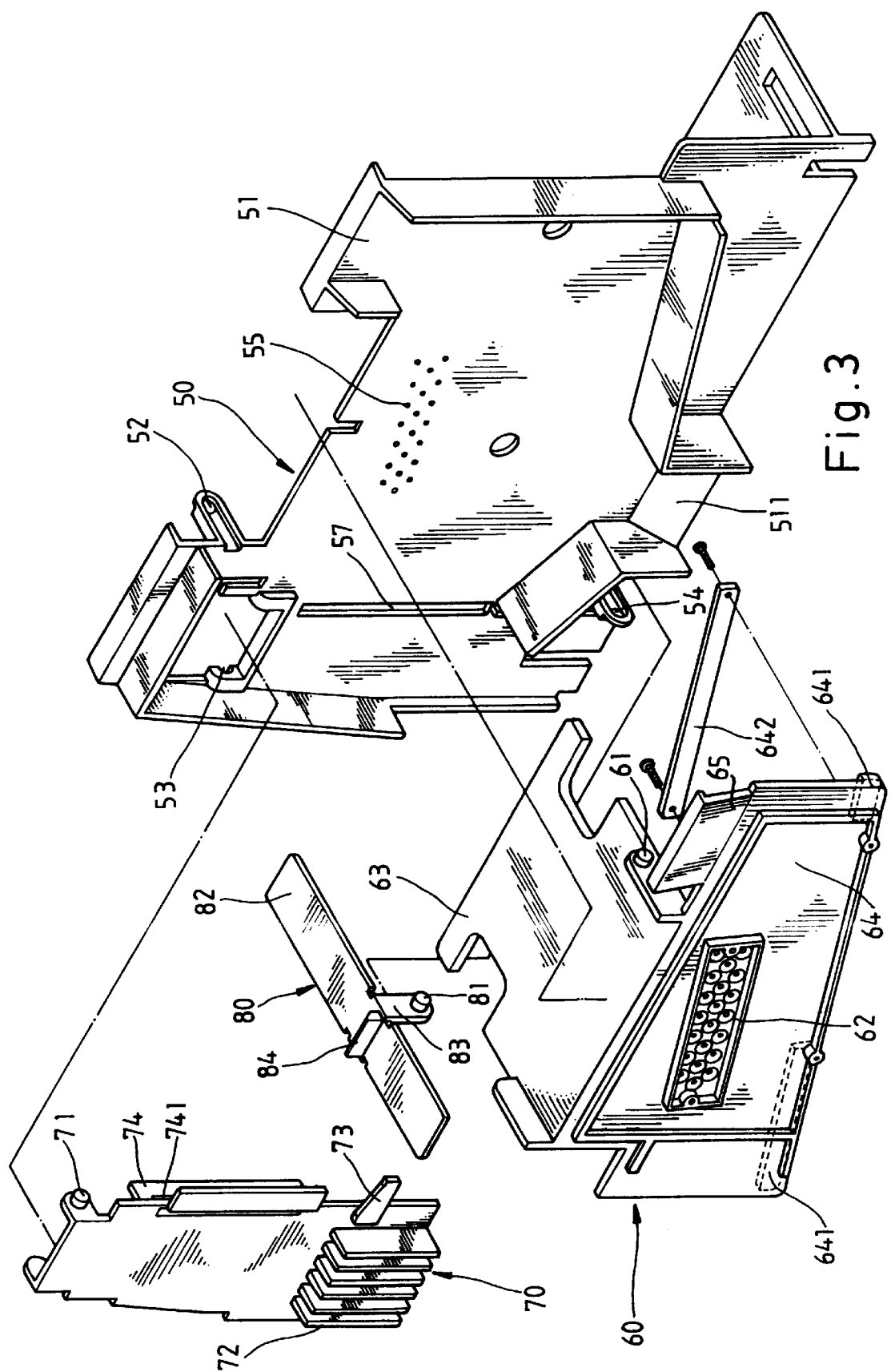
FIG. 3 is an exploded view of the operation module for the pay phone according to the present invention.
Figure 4:
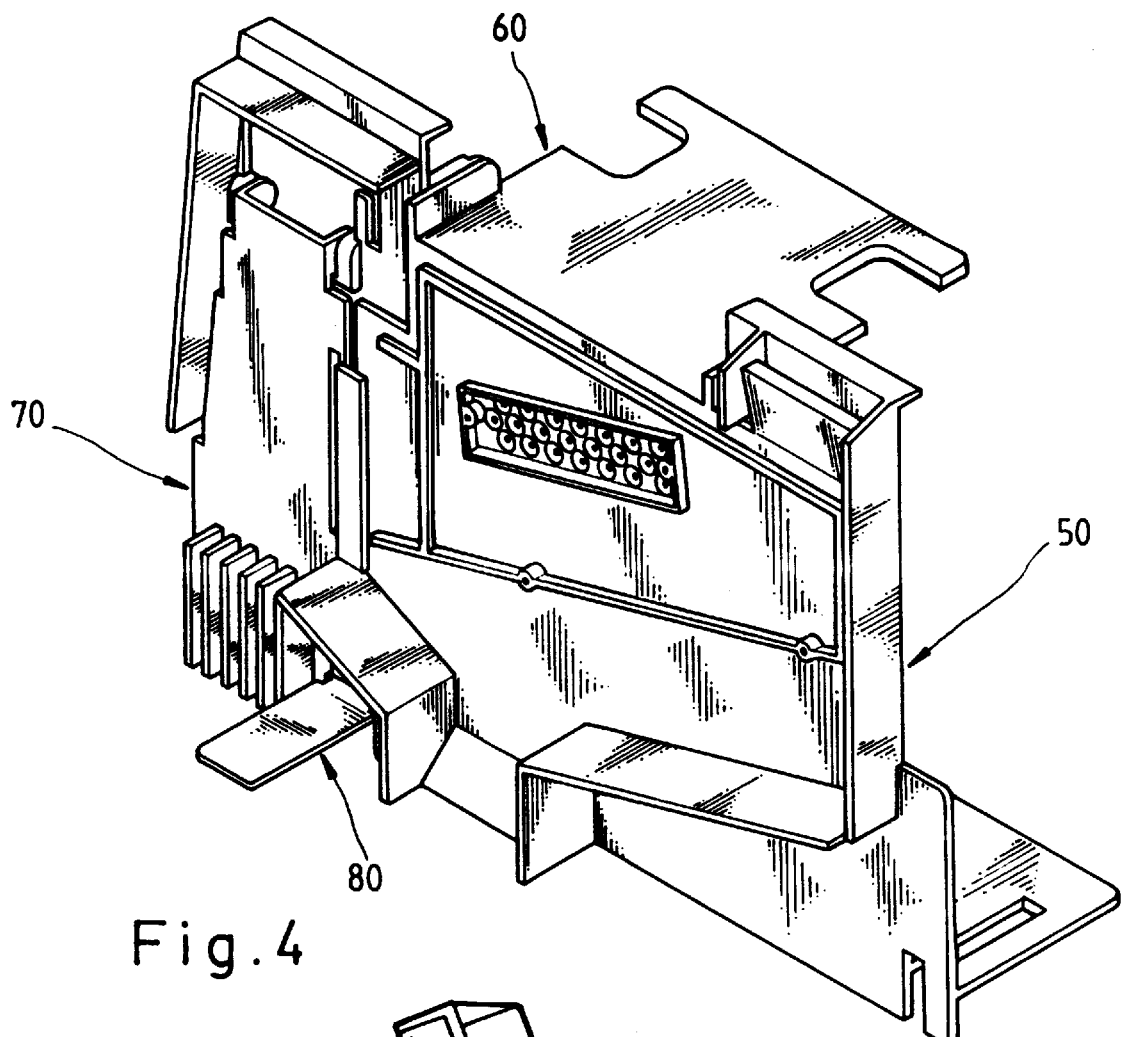
FIG. 4 is an assembly view of the operation module shown in FIG. 3.

Referring to FIG. 2 and FIG. 1 again, an operation module 20 is mounted inside the casing of the pay phone 1. and acted with the switch hook 11 and the push button 12 to achieve the functions of "talk", "coin intake", "line off" and "coin return".

Figure 5:
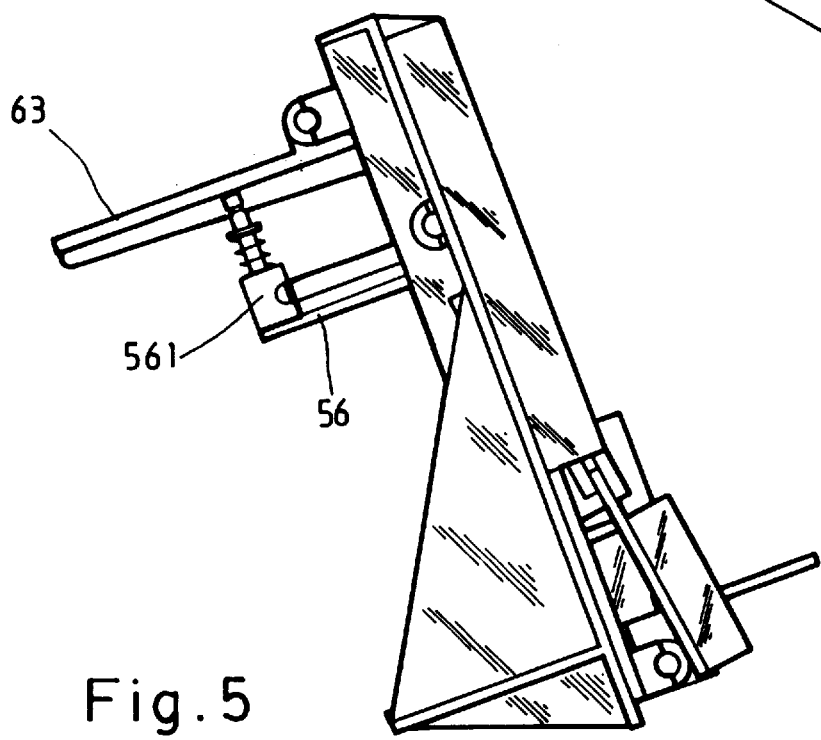
FIG. 5 is a side view of the operation module shown in FIG. 4.

Referring to Figures from 3 to 5, the operation module 20 is comprised of a base frame 50, a movable frame 60, a suspension frame 70, and a switching frame 80. The base frame 50 comprises a coin inlet 51 at the top of one lateral side thereof which is closely attached to the coin slot 13 at the bottom (see also FIG. 2), a coin outlet 511 at the bottom side thereof on the middle, a plurality of mounting lugs 52;53;54 for holding the movable frame 60, the suspension frame 70 and the switching frame 80, a plurality of through holes 55 through which an inserted coin which passes from the coin inlet 51 toward the coin outlet 511 is scanned by a coin recognition scanning mechanism 62 at the movable frame 60 (so that the value of the inserted coin is recognized), a protruded flange 56, and a line switch 561 mounted on the protruded flange 56. The movable frame 60, the suspension frame 70 and the switching frame 80 are respectively pivoted to the mounting lugs 52;53;54 by respective pivots 61;71;81. The switch 561 is controlled by an actuating board 63 of the movable frame 60 to hang up the line (see FIG. 5). The movable frame 60 comprises an actuating board 63 horizontally disposed at the top, a vertical board 64 perpendicularly downwardly extended from the actuating board 63, a coin recognition scanning mechanism 62 mounted on the vertical board 64, a sliding track 641 along the bottom side of the vertical board 64, a part of the sliding track 641 is formed of a metal rail 642, a damper 65. The design of the metal rail 642 is to prevent the inserted coin from a high jump. If the inserted coin jumps when it falls to the sliding track 641;642, the coin recognition scanning mechanism 62 may be unable to accurately achieve a scanning operation. When the movable frame 60 and the base frame 50 are coupled together, the sliding track 641;642 define with the base frame 50 a coin passage way. The damper 65 is moved with the movable frame 60 to close/open the coin inlet 51. The suspension frame 70 comprises a plurality of plates 72 near the bottom which give a weight to the bottom side of the suspension frame 70, a protruded stop rod 73 at one side of the plates 72, and a control board 74 raised from the back side. The control board 74 defines a coin inlet 741. The switching board 80 comprises a plank 82, a stop plate 84 transversely raised from the top side of the plank 82 on the middle, a mounting plate 83 raised from the bottom side of the plank 82 on the middle, and a pivot 81 raised from the mounting plate 83 and coupled to the lug 54 of the base frame 50. The stop plate 84 is moved with the switching board 80 to control the passage of the coin inlet 741 on the control board 74 of the suspension frame 70.

Figure 6:
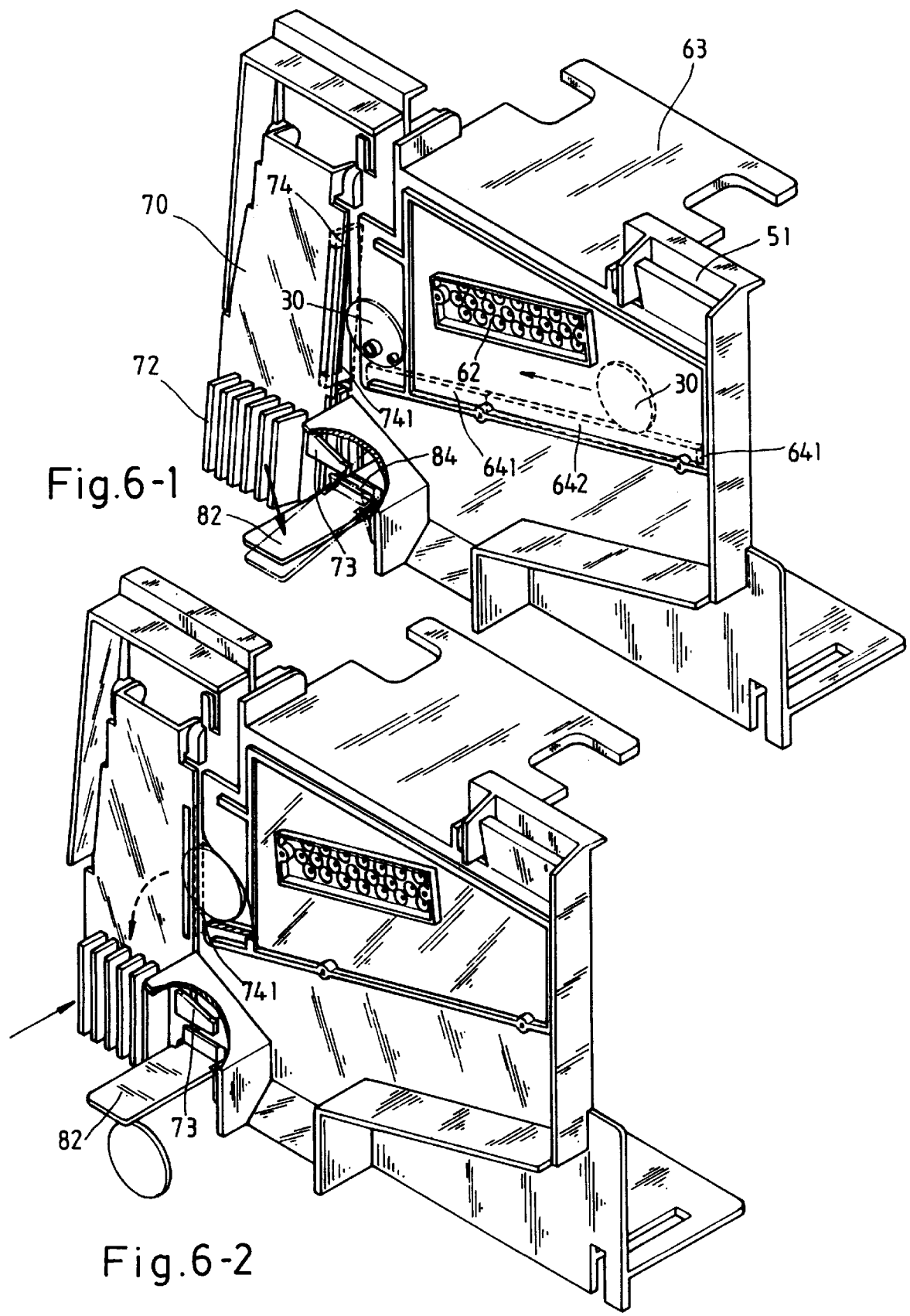
Figures 1, 2, 7:
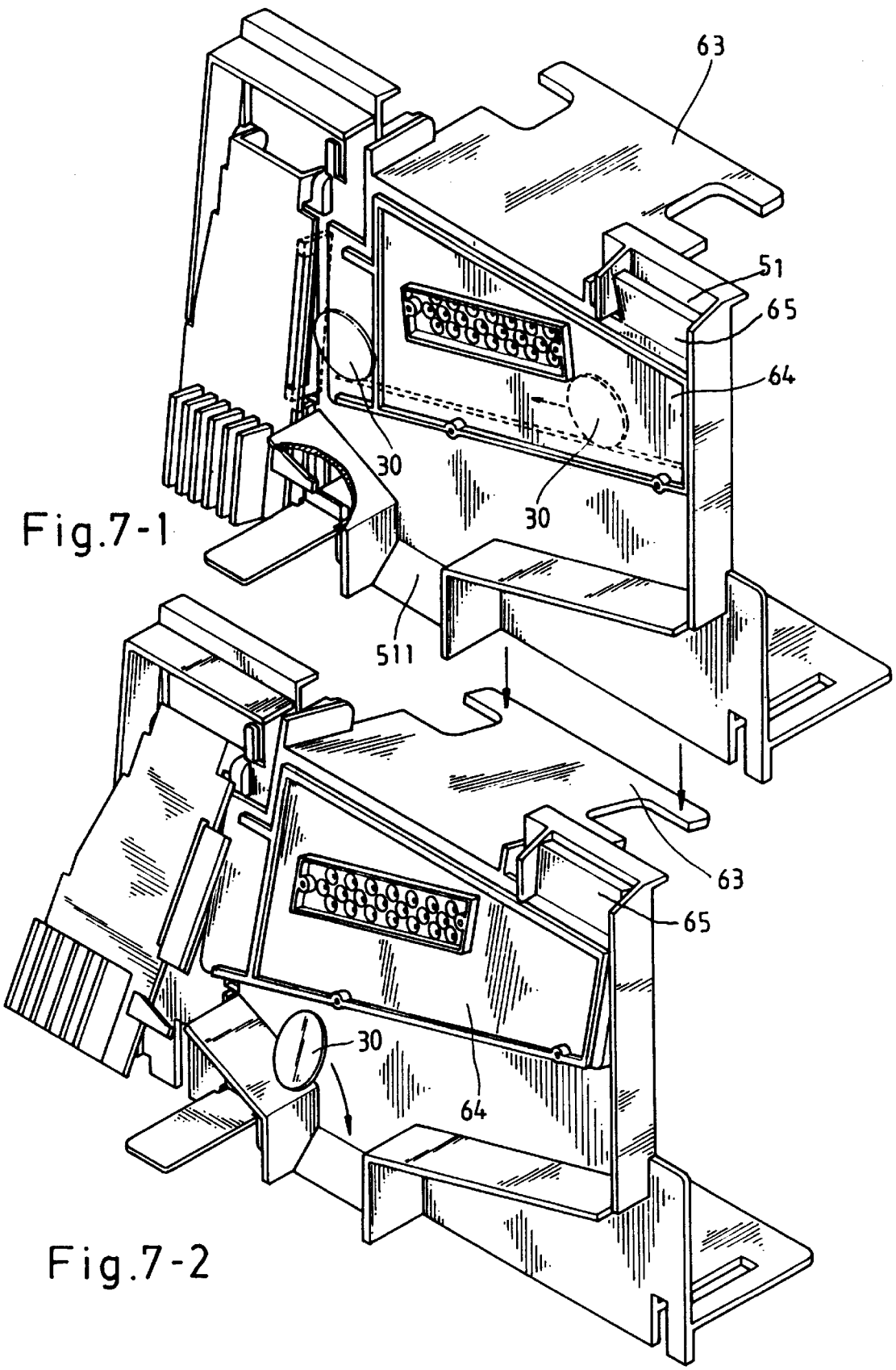

The operation of the present invention is outlined hereinafter with reference to FIGS. 6-1, 6-1, 7-1, 7-2 and FIG. 2 again. When a coin 30 is inserted into the coin slot 13, it immediately moves through the coin inlet 51 on the base frame 50 along the sliding track 641;642. When passing through the sliding track 641;642, the coin 30 is scanned by the coin recognition scanning mechanism 62, and then the coin recognition scanning mechanism 62 outputs a signal to the microprocessor at the main board (not shown) of the pay phone, enabling the microprocessor to calculate communication time subject to the value of the coin 30. At this time, the stop rod 73 of the suspension frame 70 is stopped at the stop plate 84 of the switching frame 80, thereby causing the suspension frame 70 to be tilted at an angle, and therefore the coin inlet 741 on the control board 74 of the suspension frame 70 is not in alignment with the sliding track 641;642 (see FIG. 6-1). When the coin 30 is moved to the end of the sliding track 641;642, it is stopped outside the coin inlet 741 on the control board 74 of the suspension frame 70. When the push button 12 is depressed, a downward pressure is given to one end of the plant 82 of the switching frame 80, causing the stop plate 84 of the switching frame 80 to be disengaged from the stop rod 73 of the suspension frame 70. When the suspension frame 70 is released from the constraint of the stop plate 84 of the switching frame 80, the weight of the plates 72 forces the suspension frame 70 to be turned from the tilted position to a vertical position, enabling the control board 74 of the suspension frame 70 to be inserted into an elongated slot 57 on the base frame 50. When the control board 74 is inserted into the elongated slot 57 on the base frame 50, the coin inlet 741 is moved into alignment with the sliding track 641;642, enabling the coin 30 to be guided to the coin box (see FIG. 6-2). On the contrary, if the line is not connected. the switch hook 11 is pressed down to impart a downward pressure to the actuating board 63 of the movable frame 60. causing the vertical board 64 to be titled at an angle. When the vertical board 64 is tilted, the coin 30 is allowed to move to the coin outlet 511 on the base frame 50 (see FIG. 7-2), and then to move from the coin outlet 511 to the coin-return assembly 14. Because the whole movable frame 60 is tilted at an angle when the switch hook 11 is depressed, the coin 30 will not be jammed in the coin passage way. Further, when the handset is hung on the switch hook 11, the line switch 561 is driven to switch off the line (see also FIG. 5), and the damper 65 is tilted with the movable frame 60 to close the coin inlet 51, and therefore a coin cannot be completely inserted into the coin slot 13 when the handset is hung on the switch hook 11.

While only one embodiment of the present invention has been shown and described, it will be understood that various modifications and changes could be made thereunto without departing from the spirit and scope of the invention disclosed.

What the invention claimed is:

1. A pay phone comprising a handset, a switch hook, a push button, a coin slot, a coin box, a coin-return assembly, and an operation module acted with said switch hook and said push button to achieve the functions of "talk", "coin intake", "line off" and "coin return", wherein said operation module comprises:

a base frame, said base frame comprising a coin inlet attached to said coin slot at a bottom side to guide in the coin being inserted into said coin slot, a coin outlet at a bottom side thereof connected to said coin-return assembly to guide the inserted coin to said coin-return assembly;

a movable frame pivoted to said base frame, said movable frame comprising an actuating board suspended above said base frame below said switch hook, a vertical board perpendicularly downwardly extended from said actuating board, a coin recognition scanning mechanism mounted on said vertical board to scan the inserted coin, a sliding track along a bottom side of said vertical board for guiding, said sliding track defining with said base frame a coin passage way for guiding the inserted coin from said coin slot to one of said coin box and said coin-return assembly;

a suspension frame pivoted to said base frame at one lateral side adjacent to said movable frame, said suspension frame comprising a fixed top end pivoted to said base frame, a free bottom end, weight means fixedly mounted on said free bottom end, a stop rod protruded from one side thereof, a control board raised from a back side thereof, and a coin inlet defined on said control board, said control board being moved with said suspension frame between a first position where the coin inlet on said control board being retained in alignment with said coin passage way to guide the inserted coin from said coin passage way to said coin box, and a second position where the coin inlet on said control board being moved away from said coin passage way, enabling the inserted coin to be stopped at one end of said sliding track by said control board;

a switching board pivoted to said base frame adjacent to said suspension frame, said switch board comprising a plank, a stop plate transversely raised from a top side of said plank on the middle, a mounting plate raised from a bottom side of said plank on the middle and pivoted to said base frame, the stop plate of said switching board being stopped against the stop rod of said suspension frame when said push button is off, enabling said control board of said suspension frame to be retained in said second position, said plank being forced by said push button to disengage said stop plate of said switching frame from said stop rod of said suspension frame when said push button is depressed, enabling said control board to be moved with said suspension frame to said first position.

2. The pay phone of claim 1 wherein said sliding track is moved with said movable frame away from said movable frame when said switch hook is depressed after insertion of a coin into said coin slot, enabling the inserted coin to fall through the coin outlet on said base frame to said coin-return assembly.

3. The pay phone of claim 1 wherein said base frame comprises a protruded flange, and a line switch mounted on said protruded flange, said line switch being driven by the actuating board of said movable frame to switch off the telephone line when said handset is hung up or said switch hook is depressed.

4. The pay phone of claim 1 wherein said base frame comprises a plurality of through holes through which the inserted coin which passes from the coin inlet on said base frame is scanned by said coin recognition scanning mechanism.

5. The pay phone of claim 1 wherein said sliding track has at least one part formed of a metal rail.

6. The pay phone of claim 1 wherein said movable frame comprises a damper which is moved with said movable frame to close the coin inlet on said base frame when said handset is hung up.

\* \* \* \* \*